No. 840,742. PATENTED JAN. 8, 1907.
H. H. BENN.
FRICTION CLUTCH COUPLING.
APPLICATION FILED MAR. 21, 1906.

2 SHEETS—SHEET 1.

Witnesses.

Inventor.
Hans H. Benn.
By
Atty's

No. 840,742. PATENTED JAN. 8, 1907.
H. H. BENN.
FRICTION CLUTCH COUPLING.
APPLICATION FILED MAR. 21, 1906.

2 SHEETS—SHEET 2.

WITNESSES:

INVENTOR
Hans H. Benn.
BY
Attorneys

UNITED STATES PATENT OFFICE.

HANS HAMILTON BENN, OF LONDON, ENGLAND.

FRICTION-CLUTCH COUPLING.

No. 840,742.          Specification of Letters Patent.          Patented Jan. 8, 1907.

Application filed March 21, 1906. Serial No. 307,238.

To all whom it may concern:

Be it known that I, HANS HAMILTON BENN, a subject of the King of Great Britain, residing at 7 Montpelier Square, Knightsbridge, London, Middlesex, England, have invented new and useful Improvements in or Relating to Friction-Clutch Couplings, of which the following is a specification.

My invention relates to friction-clutches for coupling shafts and pulleys of the kind described in the specification of my former British patent, No. 8,854 of 1899.

According to the invention my improved clutch comprises a hollow drum, which is secured to the end of one of the shafts to be coupled, and a disk, which is keyed to the adjacent end of the other shaft, which extends into the hollow drum in such a manner that the said disk is in close proximity to the inner face of the drum. The outer end or cover of the drum is adjustably attached to the drum-body by means of a screw-thread and is provided with a central sleeve adapted to form a bearing for the second shaft and with slots or holes, by means of which it can be adjusted in position through the medium of a spanner or the like. The inner face of the drum-cover is provided with projecting pins, upon which is mounted a friction plate or ring connected to the drum-cover by means of toggle-links—say four in number—which are connected together at their outer ends or outside the drum or at the ends of their extensions by means of springs in such a manner that they are normally extended, so as to force the friction plate or ring against the disk and the latter against the inner face of the drum, thereby locking the two shaft parts together.

To disengage the clutch, I provide for actuating the toggle-links against the action of the springs, and to this end the said links are provided with extensions passing through the cover and having downwardly-extending arms carrying rollers bearing upon a conical head adapted to slide upon the aforesaid drum-sleeve in such a manner that when the said sleeve is slid toward the drum the toggle-links are bent, thus withdrawing the friction-ring from the disk, or the toggle-links may be connected to the sliding head by means of links.

To enable the invention to be fully understood, I will describe it by reference to the accompanying drawings, in which—

Figure 1:
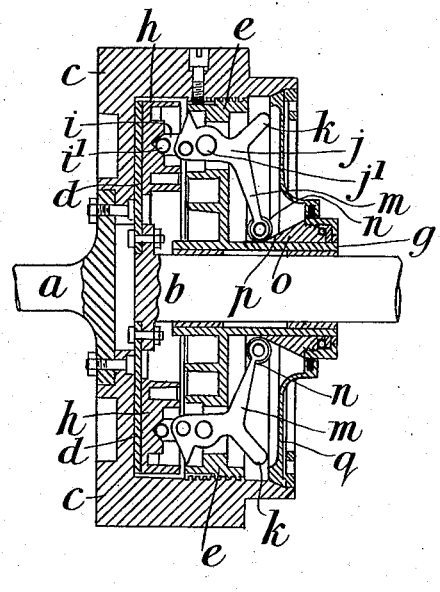
Figure 3:
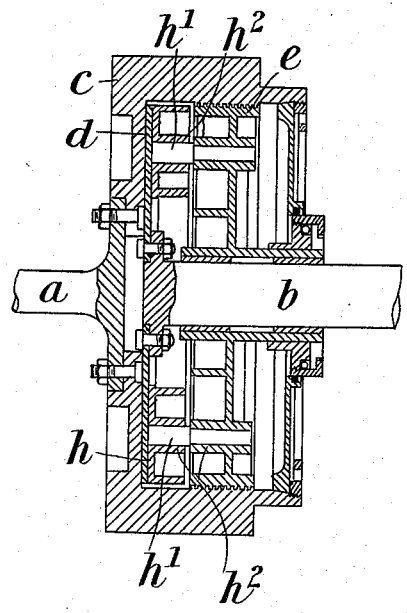
Figure 2:
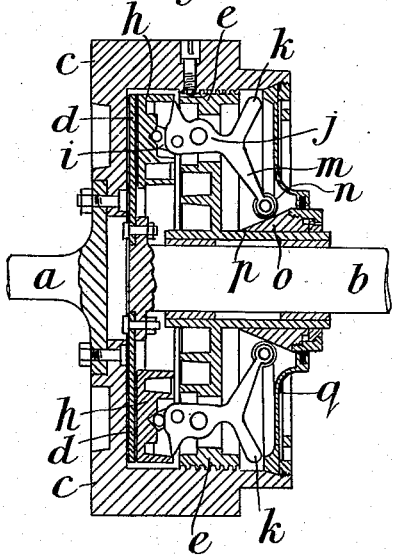
Figure 4:
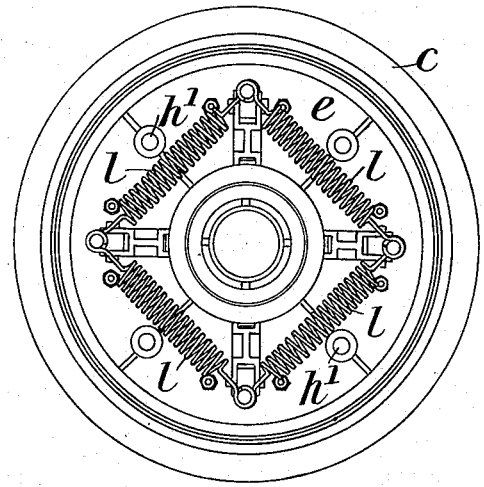
Figure 5:
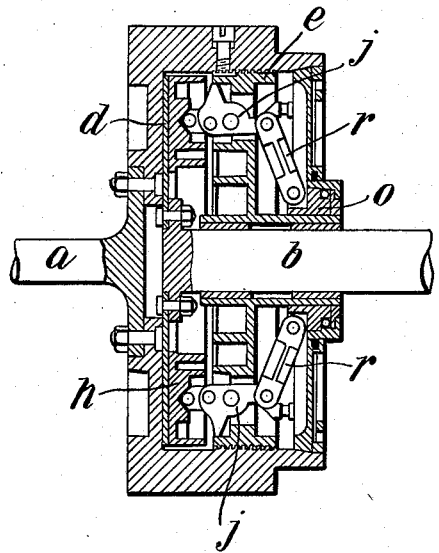
Figure 6:
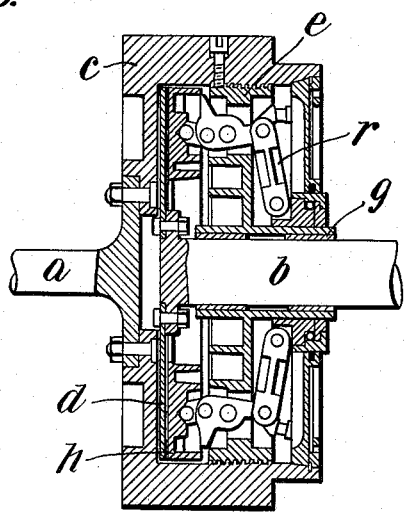

Figure 1 is a vertical section of a clutch constructed according to the invention, the clutch being shown in the operative position; and Fig. 2 is a view similar to Fig. 1, showing the clutch disengaged. Fig. 3 is a section similar to Figs. 1 and 2, the section being in another plane. Fig. 4 is a face view with outer oil-cover removed, illustrating the connection of the toggle-links by the springs; and Figs. 5 and 6 are views similar to Figs. 1 and 2, illustrating a modification.

$a$ represents, say, the driving-shaft, and $b$ the driven shaft.

$c$ is the drum, which is bolted to the end of the driving-shaft $a$, and $d$ is the disk, which is likewise bolted to the inner end of the shaft $b$, the said shaft $b$ extending into the drum $c$ in such a manner that the disk $d$ is brought into proximity to the inner face of the said drum $c$.

$e$ is the drum-cover, which is screwed into the open end of the drum-body $c$, as shown at $f$, and $g$ is the sleeve, which is provided at the center of the said cover $e$.

$h$ is the friction ring or disk, which is located within the drum $c$ and in proximity to the disk $d$, and $i\,j\,i\,j$ are the pairs of links forming the toggles for connecting the friction-ring $h$ with the cover $e$. The links $i$ are pivoted to the friction-ring $h$ at $i'$ at one end and at the other end to the links $j$, which are themselves pivoted at $j'$ to the drum-cover $e$. The links $j$ extend through holes in the cover $e$ and are provided with extensions $k$, by means of which they are connected together through the medium of the springs $l$. (See Fig. 4.) By this means the springs normally extend the toggle-links $i\,j$, as shown in Fig. 1, so as to press the friction-ring $h$ against the disk $d$ and the latter against the inner face of the drum $c$, thereby coupling the shafts $a$ and $b$ together.

$h'\,h'$, Fig. 3, are pins mounted in holes $h^2\,h^2$ in the cover $e$ and friction-ring $h$, the said pins locking these two parts together, but permitting them to move toward or recede from one another.

$m\,m$ are the downwardly-extending arms formed upon the links $j$, and $n$ represents the rollers, which are provided at the lower ends of the same arms, $o$ being the head, which is loosely mounted upon the sleeve $g$ in such a manner that it can slide thereon. This head is coned, as shown at $p$, and by sliding the said head toward the drum-cover $e$ the arms $m$ are raised, so as to break the joint of the toggle-links against the action of the springs $l$, and thus release the coupling.

$q$ is a cover, which is provided as a protection against dust and to retain the oil with which the drum is partially filled.

Figs. 5 and 6 illustrate the modification wherein in lieu of the arms $m$, rollers $n$, and conical head $o$ I make use of links $r\ r$, connecting the links $j'$ to the said sliding head $o'$.

In practice I find it advantageous to perforate the disk $d$, so as to provide receptacles for the lubricant, the said lubricant being forced into these holes when the clutch is put into gear, thereby enabling engagement to take place rapidly, the oil remaining in the perforations until the clutch is again disengaged.

The operation of the coupling is as follows—that is to say, when the sliding head $o$ is withdrawn, as shown in Figs. 1 and 5, the toggle-links are extended by the action of the springs $l\ l$, so as to force the friction-ring $h$ into contact with the disk $d$ and the latter into contact with the inner face of the drum $c$, thereby locking the said disk and drum together. To put the clutch out of gear, the sliding head $o$ is pushed toward the cover $e$ of the drum, thus withdrawing the friction-ring $h$ and releasing the disk $d$ of pressure.

Having now particularly described and ascertained the nature of my said invention and in what manner the same is to be performed, I declare that what I claim is—

1. In a clutch-coupling of the kind described, the combination with a driving-shaft and a driven shaft in line with one another and having their ends adjacent, of a friction-disk mounted on the end of one of said shafts, a drum mounted on the adjacent end of the other of said shafts, a friction-ring mounted on said drum in line with said friction-disk and capable of moving into and out of engagement with said disk, toggle-links pivoted at one end to said ring and pivoted at their other end to said drum and means for operating said toggle-links to throw said ring into and out of engagement with said disk, substantially as described.

2. In a clutch-coupling of the kind described, the combination with a driving-shaft and a driven shaft in line with one another and having their ends adjacent, of a friction-disk mounted on the end of one of said shafts, a drum mounted on the adjacent end of the other of said shafts, a friction-ring mounted on said drum in line with said friction-disk and capable of moving into and out of engagement with said disk, toggle-links connecting said ring with said drum, means connected with said toggle-links for normally holding said ring in engagement with said disk and means for operating said toggle-links to throw said ring out of engagement with said disk, substantially as described.

3. In a clutch-coupling of the kind described, the combination with a driving-shaft and a driven shaft in line with one another and having their ends adjacent, of a hollow drum secured to the end of one of said shafts and provided with a friction-face, a friction-disk secured to the adjacent end of the other of said shafts, in line with and adjacent to said friction-face of said drum, a friction-ring mounted within said drum in line with said friction-disk and adjacent to its rear face, said ring being capable of moving into engagement with said disk to throw said disk into engagement with the friction-face of said drum, toggle-links pivoted at one end to said ring and pivoted at their other end to said drum and means for operating said toggle-links to throw said friction-ring into and out of engagement with said disk, substantially as described.

4. In a clutch-coupling of the kind described, the combination with a driving-shaft and a driven shaft in line with one another and having their ends adjacent, of a hollow drum secured to the end of one of said shafts and provided with a friction-face, a friction-disk secured to the adjacent end of the other of said shafts, in line with and adjacent to said friction-face of said drum, a friction-ring mounted within said drum in line with said friction-disk and adjacent to its rear face, said ring being capable of moving into engagement with said disk to throw said disk into engagement with the friction-face of said drum, toggle-links connecting said ring with said drum, coiled springs connecting said toggle-links and adapted to operate said links to normally hold said friction-ring in engagement with said friction-disk and means for operating said toggle-links to throw said ring out of engagement with said disk, substantially as described.

5. In a clutch-coupling of the kind described, the combination with a driving-shaft and a driven shaft in line with one another and having their ends adjacent, of a hollow drum secured to the end of one of said shafts and provided with a friction-face, a friction-disk secured to the adjacent end of the other of said shafts, in line with and adjacent to said friction-face of said drum, a friction-ring mounted within said drum in line with said friction-disk and adjacent to its rear face, said ring being capable of moving into engagement with said disk to throw said disk into engagement with the friction-face of said drum, toggle-links connecting said ring with said drum, a sliding head mounted on one of said shafts, links connecting said sliding head with said toggle-links and means for normally retaining said toggle-links in position to lock said ring in engagement with said disk, substantially as described.

6. In a clutch-coupling of the kind described, the combination with a driving-shaft and a driven shaft in line with one another and having their ends adjacent, of a hollow drum secured to the end of one of said shafts and provided with a friction-face, a friction-disk secured to the adjacent end of the other of said shafts, in line with and adjacent to said friction-face of said drum, a friction-ring mounted within said drum in line with said friction-disk and adjacent to its rear face, said ring being capable of moving into engagement with said disk to throw said disk into engagement with the friction-face of said drum, toggle-links connecting said ring with said drum, a sliding head mounted on one of said shafts, links connecting said sliding head with said toggle-links, coiled springs connecting said toggle-links and adapted to normally retain said links in a position to lock said friction-ring in engagement with said friction-disk and a detachable cover adapted to be secured in the open end of said hollow drum whereby the clutching mechanism is entirely incased, substantially as described.

HANS HAMILTON BENN.

Witnesses:
ALFRED C. TEVIS,
A. U. DENY.